US011932012B2

(12) United States Patent
Condello et al.

(10) Patent No.: US 11,932,012 B2
(45) Date of Patent: Mar. 19, 2024

(54) SYSTEM AND METHOD FOR OPERATING AN INKJET PRINTER TO ATTENUATE INK DRYING IN THE INKJETS DURING PRINTING OPERATIONS

(71) Applicant: Xerox Corporation, Norwalk, CT (US)

(72) Inventors: Anthony S. Condello, Webster, NY (US); Stuart A. Schweid, Pittsford, NY (US); Seemit Praharaj, Webster, NY (US); John T. Newell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 154 days.

(21) Appl. No.: 17/654,459

(22) Filed: Mar. 11, 2022

(65) Prior Publication Data

US 2023/0286261 A1 Sep. 14, 2023

(51) Int. Cl.

*B41J 2/045* (2006.01)
*B41J 2/165* (2006.01)
*B41J 2/21* (2006.01)

(52) U.S. Cl.

CPC ....... *B41J 2/04508* (2013.01); *B41J 2/04586* (2013.01); *B41J 2/16526* (2013.01); *B41J 2/21* (2013.01)

(58) Field of Classification Search

CPC ...... B41J 2/04508; B41J 2/04586; B41J 2/21; B41J 2/16526

See application file for complete search history.

(56) References Cited

U.S. PATENT DOCUMENTS

| | | | |
|---|---|---|---|
| 5,343,231 | A | 8/1994 | Suzuki |
| 5,451,990 | A | 9/1995 | Sorenson et al. |
| 5,600,350 | A | 2/1997 | Cobbs et al. |
| 5,796,414 | A | 8/1998 | Sievert et al. |
| 6,076,915 | A | 6/2000 | Gast et al. |
| 6,089,693 | A | 7/2000 | Drake et al. |
| 6,196,652 | B1 | 3/2001 | Subirada et al. |
| 6,275,600 | B1 | 8/2001 | Banker et al. |
| 6,300,968 | B1 | 10/2001 | Kerxhalli et al. |
| 6,334,720 | B1 | 1/2002 | Kato et al. |
| 6,377,758 | B1 | 4/2002 | OuYang et al. |
| 6,467,867 | B1 | 10/2002 | Worthington et al. |
| 6,494,558 | B1 | 12/2002 | Doval et al. |
| 6,554,390 | B2 | 4/2003 | Arquilevich et al. |
| 6,637,853 | B1 | 10/2003 | Ahne et al. |

(Continued)

*Primary Examiner* — Yaovi M Ameh

(74) *Attorney, Agent, or Firm* — Maginot Moore & Beck LLP

(57) ABSTRACT

A method of inkjet printer operation produces a sneeze pattern having a uniform sneeze pattern portion and a tapered area portion within the uniform sneeze pattern to operate inkjets in the printer to eject ink drops within an image area of media sheets passing through the printer to maintain the operational status of the inkjets. A dynamic threshold is applied to a portion of an uniform sneeze pattern to produce the tapered area within the uniform sneeze pattern. The dynamic threshold is changed as a function of distance between a pixel in the portion of the uniform sneeze pattern and the closest edge of an image area of the media sheet on which the tapered area of the sneeze pattern is to be printed. A second threshold can also be changed to alter a volume of ink associated with a pixel in the tapered area within the uniform sneeze pattern.

16 Claims, 9 Drawing Sheets

(56) References Cited

U.S. PATENT DOCUMENTS

| | | | | |
|---|---|---|---|---|
| 6,847,465 | B1 | 1/2005 | Wetchler et al. | |
| 6,883,892 | B2 | 4/2005 | Sievert et al. | |
| 6,942,313 | B2 | 9/2005 | Kanda | |
| 6,993,275 | B2 | 1/2006 | Mitsuya et al. | |
| 7,073,883 | B2 | 7/2006 | Billow | |
| 7,118,188 | B2 | 10/2006 | Vilanova et al. | |
| 7,254,254 | B2 | 8/2007 | Ueda et al. | |
| 7,380,897 | B2 | 6/2008 | Anderson et al. | |
| 7,390,073 | B2 | 6/2008 | Bailey et al. | |
| 7,391,525 | B2 | 6/2008 | Chapman et al. | |
| 7,478,894 | B2 | 1/2009 | Kim et al. | |
| 7,515,305 | B2 | 4/2009 | Mizes | |
| 7,549,721 | B2 | 6/2009 | Nakano et al. | |
| 7,552,986 | B2 | 6/2009 | Mizes et al. | |
| 7,607,752 | B2 | 10/2009 | Childers et al. | |
| 7,630,653 | B2 | 12/2009 | Bonino | |
| 7,637,586 | B2 | 12/2009 | Yun | |
| 7,686,298 | B2 | 3/2010 | Fioravanti et al. | |
| 2002/0135629 | A1 | 9/2002 | Sarmast et al. | |
| 2003/0231350 | A1 | 12/2003 | Yamagishi | |
| 2004/0160468 | A1 | 8/2004 | Kim et al. | |
| 2005/0099447 | A1 | 5/2005 | Hsu et al. | |
| 2008/0007585 | A1* | 1/2008 | Ueda .................... | B41J 2/16526<br>347/15 |
| 2009/0322849 | A1 | 12/2009 | Calamita et al. | |
| 2010/0013882 | A1 | 1/2010 | Mizes et al. | |
| 2018/0244048 | A1* | 8/2018 | Ito ........................ | B41J 2/33515 |

* cited by examiner

SYSTEM AND METHOD FOR OPERATING AN INKJET PRINTER TO ATTENUATE INK DRYING IN THE INKJETS DURING PRINTING OPERATIONS

TECHNICAL FIELD

This disclosure is directed to printheads that eject liquid ink to form ink images on substrates as they pass the printheads and, more particularly, to the operation of the inkjets during ink image printing to help maintain the operational status of the inkjets in the printheads.

BACKGROUND

Inkjet imaging devices eject liquid ink from printheads to form images on an image receiving surface. The printheads include a plurality of inkjets that are arranged in some type of array. Each inkjet has a thermal or piezoelectric actuator that is coupled to a printhead driver. The printhead controller generates firing signals that correspond to digital data for images. Actuators in the printheads respond to the firing signals by expanding into an ink chamber to eject ink drops onto an image receiving member and form an ink image that corresponds to the digital image used to generate the firing signals.

Inkjets, especially those in printheads that eject aqueous inks, need to regularly fire to help prevent the ink in the nozzles from drying. If the viscosity of the ink increases too much, the probability of an inkjet failure increases substantially. To maintain the operational status of the inkjets, each inkjet is periodically operated to eject single drops from each nozzle in some prescribed pattern onto a printed page. This pattern is designed to be below the visibility threshold of the viewer. If the pattern is too dense, the customer finds the print objectionable, if the pattern is not dense enough, the firing frequency of the inkjets may be insufficient to maintain the operational status of the inkjets. This method is typically referred to as “sneezing” or “background jetting.” Inkjet printers would benefit from maximizing the number of ink drops in a sneeze pattern while minimizing the visibility of the pattern on the print.

SUMMARY

A new method of operating inkjets in an inkjet printer during printing operations maximizes the number of ink drops in a sneeze pattern while minimizing the visibility of the pattern on the print. The method includes generating a uniform sneeze pattern, modifying a portion of the uniform sneeze pattern to form a tapered area within the uniform sneeze pattern, and operating inkjets using the uniform sneeze pattern and the tapered area within the uniform sneeze to print a sneeze pattern within an image area of a media sheet.

A new inkjet printer operates inkjets in an inkjet printer during printing operations to disperse ink drops in a sneeze pattern so the number of ink drops in the pattern is maximized while the visibility of the pattern on the print is minimized. The new inkjet printer includes a media transport configured to carry media sheets through the inkjet printer, at least one printhead configured to eject ink drops onto the media sheets as the media sheets pass the at least one printhead, and a controller operatively connected to the at least one printhead. The controller is configured to generate a uniform sneeze pattern, modify a portion of the generated uniform sneeze pattern to generate a tapered area within the uniform sneeze pattern, and operate inkjets in the at least one printhead using the uniform sneeze pattern and the tapered area within the uniform sneeze pattern to print a sneeze pattern within an image area of a media sheet as the media sheet passes the at least one printhead.

BRIEF DESCRIPTION OF THE DRAWINGS

The foregoing aspects and other features of operating an inkjet printer to maximize the number of ink drops in a sneeze pattern while minimizing the visibility of the pattern on the print are explained in the following description, taken in connection with the accompanying drawings.

DETAILED DESCRIPTION

Figure 1:
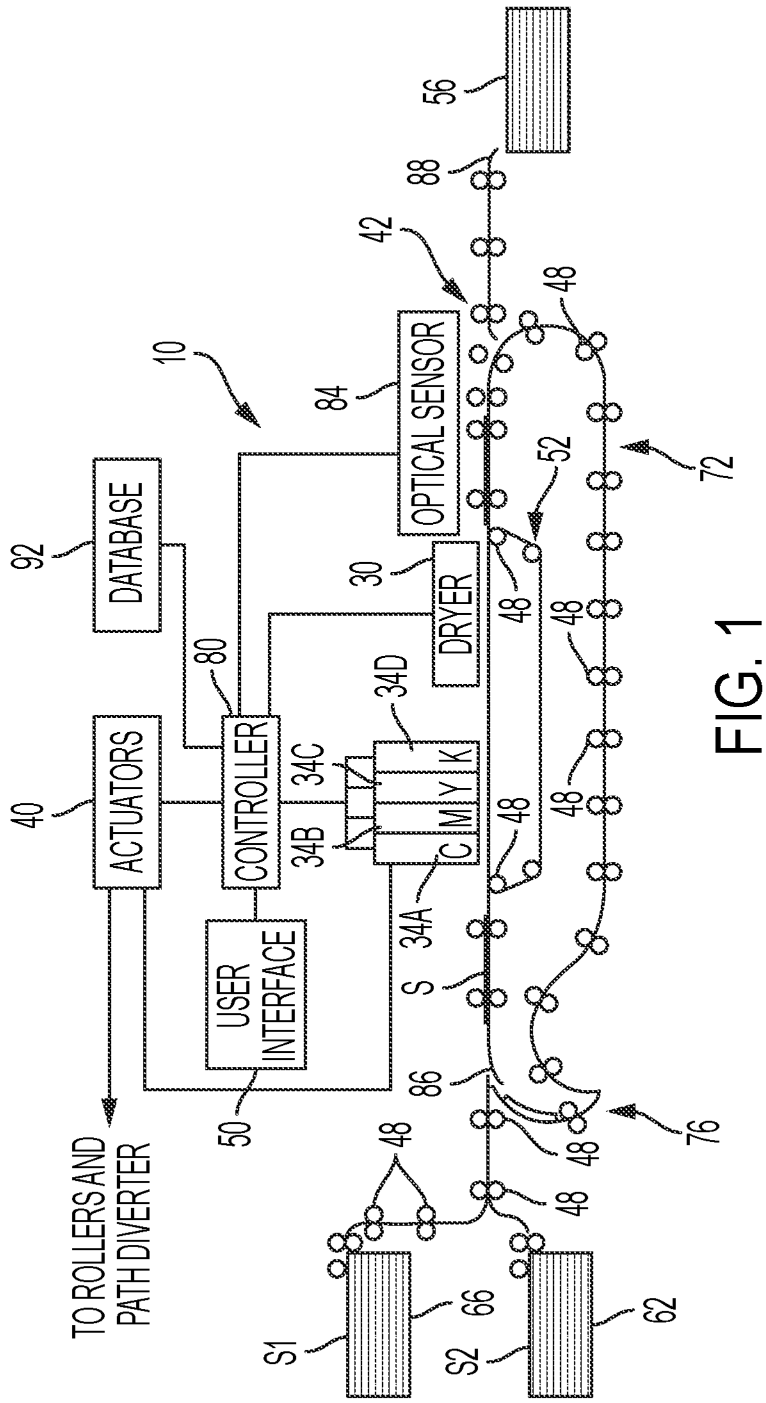
FIG. 1 depicts an inkjet printer that maximizes the number of ink drops in a sneeze pattern while minimizing the visibility of the pattern on the print.

For a general understanding of the environment for the system and method disclosed herein as well as the details for the system and method, reference is made to the drawings. In the drawings, like reference numerals have been used throughout to designate like elements. As used herein, the word “inkjet printer” encompasses any apparatus that produces ink images on media by operating inkjets in printheads to eject drops of ink toward the media. As used herein, the term “process direction” refers to a direction of travel of an image receiving surface, such as an imaging drum or print media, and the term “cross-process direction” is a direction that is substantially perpendicular to the process direction along the surface of the image receiving surface. As used in this document, the term “sneeze drop” or “sneeze drop ejection” refers to non-image ink drops ejected by identified inkjets to maintain the operational status of the inkjets in the printer. Also, the description presented below is directed to a system for operating inkjets in an inkjet printer to reduce appreciate that the principles set forth in this description are applicable to similar imaging devices that generate images with pixels of other types of marking material.

Figure 8:
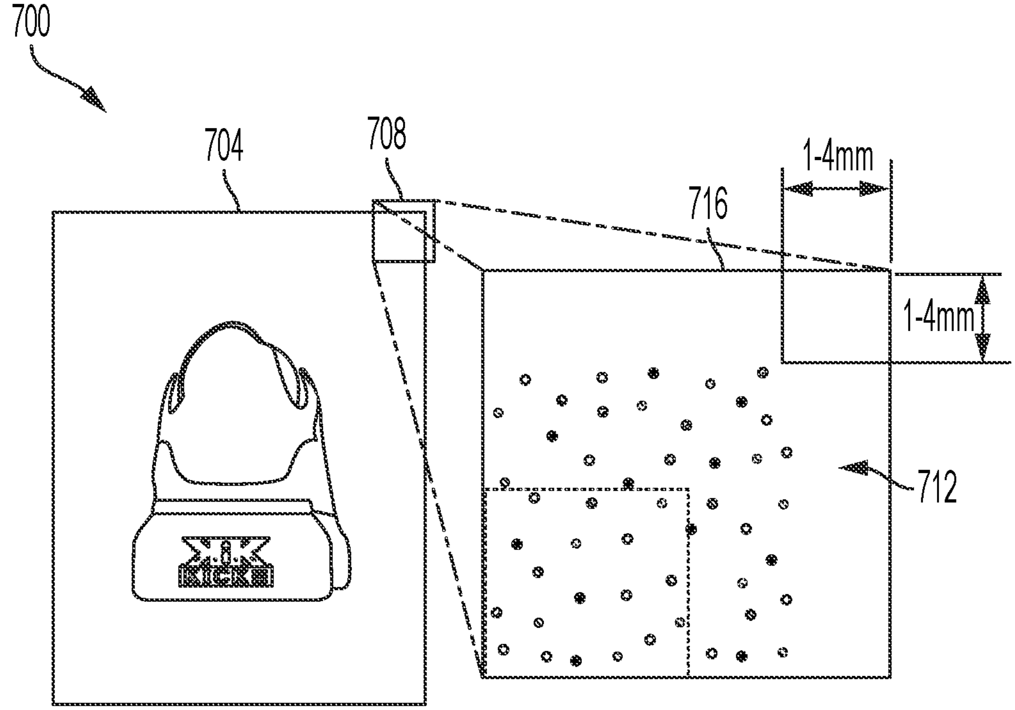
FIG. 8 PRIOR ART
FIG. 8 depicts a uniform sneeze pattern formed by a prior art inkjet printer.

The printer and method described below produces a tapered area in a uniform sneeze pattern to maximize the number of ink drops in a sneeze pattern while minimizing the visibility of the sneeze pattern. The tapered areas of the uniform sneeze pattern aid in hiding the comparatively sharp contrast between the printed tapered area of the uniform sneeze pattern and the non-printed white border of the media sheet. The portion of the uniform sneeze pattern that is tapered is called the "tapered area" of the uniform sneeze pattern in this document. As used in this document, the term "tapered area of a uniform sneeze pattern" means an area in the overall printed sneeze pattern where the distance between pixels increases, that is, the frequency of the pixels decreases, as a function of the distance between the outer perimeter of the image area and the area where the pixels are printed. The method of generating the tapered area of the sneeze pattern is accomplished by post-processing a uniform sneeze pattern generated by a known method, such as those disclosed in co-pending U.S. patent application Ser. No. 16/704,370, which is entitled "Methods For Operating Printhead Inkjets To Attenuate Ink Drying In The Inkjets During Printing Operations," which was filed on Dec. 5, 2019, the entirety of which is hereby expressly incorporated in this application by reference. Such a uniform sneeze pattern is shown in FIG. 8. A corner portion 708 of an image area 704 for a media sheet 700 is enlarged to the right of the sheet 700. A portion 712 of the uniform sneeze pattern is depicted in the image area 704 of sheet 700. To reduce small registration errors, unwanted image artifacts, and machine contamination, printers are configured to leave an unprinted perimeter 716 around the image area of the media sheet as a buffer. This unprinted perimeter is typically about 1 mm to about 4 mm wide and it appears at the leading edge, trailing edge, left edge and right edge of the image area. The strong contrast between this unprinted perimeter and the printed uniform sneeze pattern is typically the most easily noticeable and objectionable attribute of the uniform sneeze pattern.

The visibility of the uniform sneeze pattern is reduced by passing the uniform sneeze pattern pixels through a phase gate that controls whether the pixel location originally determined to be in the sneeze pattern remains in the pattern or is removed. That is, the only additional processing performed is the removal of some of the pixels from a portion of the uniform sneeze pattern. The portion of the image area of a media sheet in which the tapered area of the sneeze pattern is printed is called the "marginal image area" in this document. The marginal image area is that portion of the image area of a media sheet that lies between the image area in which the uniform sneeze pattern is printed and the non-printed perimeter. As used in this document, the term "uniform sneeze pattern" means a distribution of non-image pixels to be printed in the image area of a media sheet that is not within the marginal area where the tapered area of the sneeze pattern is printed. That is, the portion of the image area in which the uniform sneeze patter is printed and the portion of the image area in which the tapered area is printed are mutually exclusive. As used in this document, the term "sneeze pattern" means a distribution of non-image pixels having a uniform sneeze pattern portion and a tapered area. The phase gate used to reduce the number of pixels in the tapered area is implemented with a random number generator. In brief, a random number is generated in the range of [0 to 1) for each pixel in the uniform sneeze pattern and compared to a threshold. The threshold is dynamic and is a function of the distance between the pixel location to the closest edge of the image area in the media sheet. If the random number is less than the threshold, it remains in the pattern. Otherwise, the pixel is removed. This dynamic threshold enables the rate of sneeze production to be controlled differently throughout the image area of the media sheet. As used in this document, the term "dynamic threshold" means a value that changes over an area in which the value is applied to pixels in a sneeze pattern.

FIG. 1 depicts a high-speed color inkjet printer 10 that maximizes the number of ink drops in a sneeze pattern while minimizing the visibility of the pattern. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise a portion of the media transport 42 that passes through the print zone PZ (shown in FIG. 5) of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

As shown in FIG. 1, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80 to identify image quality issues in the printed images generated by the printer. The optical sensor 84 can be a digital camera, an array of LEDs and photodetectors, or other devices configured to generate image data of a passing surface. As already noted, the media transport also includes a duplex path that can turn a sheet over and return it to the transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Additionally, a previously known process generates a uniform sneeze pattern that is also printed in the image area of the media sheet. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image containing the image content and the sneeze pattern to be printed on a media sheet.

In the discussion below, the term "sneeze rate" is employed. This rate refers to the number of inkjet firings for an inkjet to produce sneeze drops per 10,000 scanlines. For example, a sneeze rate of 15 corresponds to the generation of 15 sneeze pixels by a single inkjet over 10,000 scanlines. An 8.5×11 inch page is about 10000 scanlines long in the short edge direction of a media sheet passing the printheads at about 1200 scanlines per inch (spi) so about 10,200 scanlines (8.5 inches*1200 scanlines/inch, 10,200 scanlines) pass an inkjet during the passage of a single sheet. Thus, the sneeze rate in this example means each inkjet produces 15 sneeze pixels on an 8.5×11 inch page that is fed into the print zone with the long edges of the sheet being the leading and trailing edges.

Since fewer ink drops are ejected into the marginal image area where the tapered area of the sneeze pattern is printed, one challenge that needs to be addressed is the need to compensate for the lower average sneeze rates in the tapered area. Since the density of the pixels in the tapered area of the sneeze pattern gradually increases from the edge of the tapered area adjacent the non-printed perimeter to the unaltered portion of the uniform sneeze pattern, not as many ink drops are ejected over time in the tapered area of the sneeze pattern. Since fewer ink drops are ejected into the marginal image area, a concern arises that the percentage of inoperative inkjets that eject into that area may increase. Thus, the inkjets that eject into the marginal image area need some kind of compensation to maintain the reliability that is expected with the use of the previously known uniform sneeze pattern.

Figure 2:
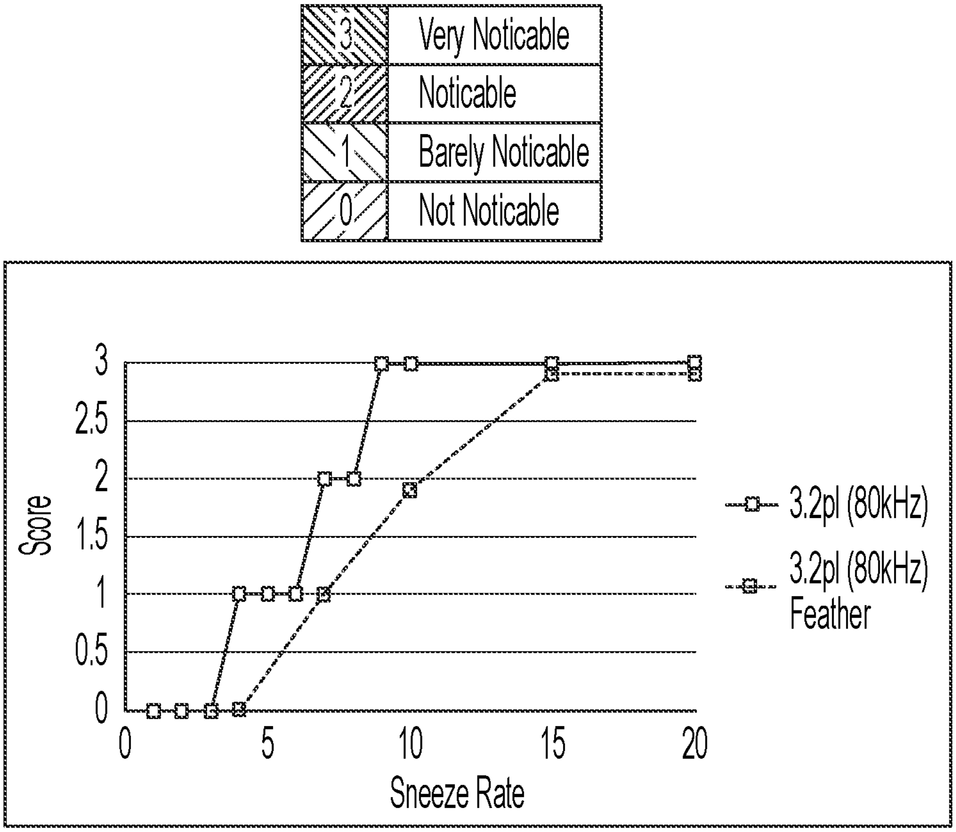
FIG. 2 is a graph of the visibility of a sneeze pattern as a function of sneeze rate when the ink drops in the sneeze pattern have the same volume.

This challenge is addressed by noting the effect that sneeze rate has on sneeze pattern visibility. The solid line in the graph of FIG. 2 shows the visibility of a uniform sneeze pattern as a function of sneeze rate. The uniform sneeze pattern that corresponds to the solid line was printed with ink drops having a size of 3.2 pl. The visibility of the uniform sneeze pattern was determined empirically and given a score between 0 and 3 with 0 indicating an imperceptible pattern and 3 indicating a very noticeable pattern. A uniform sneeze pattern generated to achieve a sneeze rate of about 7 sneeze drops per 10,000 scanlines with 3.2 pl size ink drops was noticeable in the area adjacent to the non-printed perimeter. A tapered area of the sneeze pattern, however, that is formed with 3.2 pl size ink drops was not noticeable until the sneeze rate increased to a value above 10. Thus, a tapered area of the sneeze pattern can be generated using a uniform sneeze pattern formed for a higher sneeze rate than would tolerable if the entire uniform sneeze pattern was printed. Although pixels are removed from the portion of the uniform sneeze pattern to be printed in the marginal image area, the number of pixels in the tapered area of the sneeze pattern is still greater than the number of pixels in a uniform sneeze pattern that is generated using a sneeze rate corresponding to a less noticeable uniform sneeze pattern. This increase in the number of pixels in the tapered area of the sneeze pattern means an increased firing frequency for the inkjets ejecting into the marginal image area without making the pattern noticeably visible. By increasing the firing frequency, the reliability of those inkjets remains in a range that is acceptable.

Figure 3:
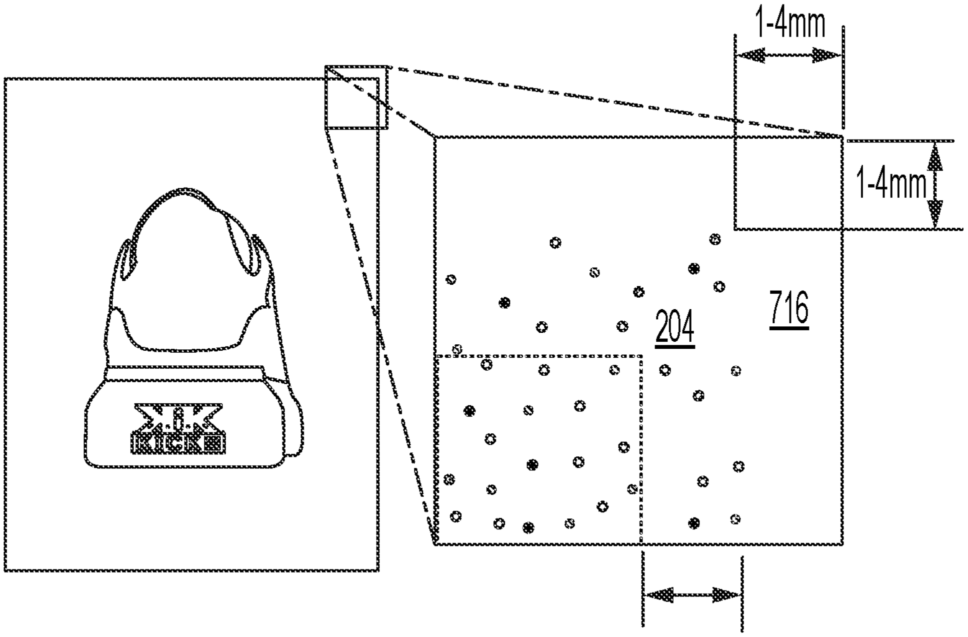
FIG. 3 depicts a distribution of ink drops having a same volume in a sneeze pattern formed by the inkjet printer of FIG. 1 that has an increasing density away from the edges of the media sheet.

FIG. 3 depicts a tapered area of a sneeze pattern that is formed from a uniform sneeze pattern generated with a sneeze rate that would be clearly noticeable if the entire uniform sneeze pattern was printed. In the pattern of FIG. 2, the portion of the image area within the dashed lines contains the pixels of uniform sneeze pattern generated at this higher sneeze rate. Because these pixels are within the central portion of the image area where the image data is likely to be the densest, the uniform sneeze pattern is not likely to be visible to an observer. In a tapered area 204 of the sneeze pattern that is printed into the marginal image area between the non-printed perimeter 716 and the area in which the uniform sneeze pattern is printed, the dynamic threshold is applied to the pixels of the uniform sneeze pattern to remove some of the ink drops. By reducing the number of ink drops in this area, the sneeze pattern is less perceptible. The distance across the tapered area 204 of the sneeze pattern printed in the marginal area is about 3 mm to about 10 mm. Although the number of the drops in the tapered area of the sneeze pattern is less than the number of the drops in the uniform sneeze pattern, the number is sufficient to provide a firing frequency for the inkjets ejecting into the marginal image area that maintains an acceptable inkjet reliability.

Figure 4:
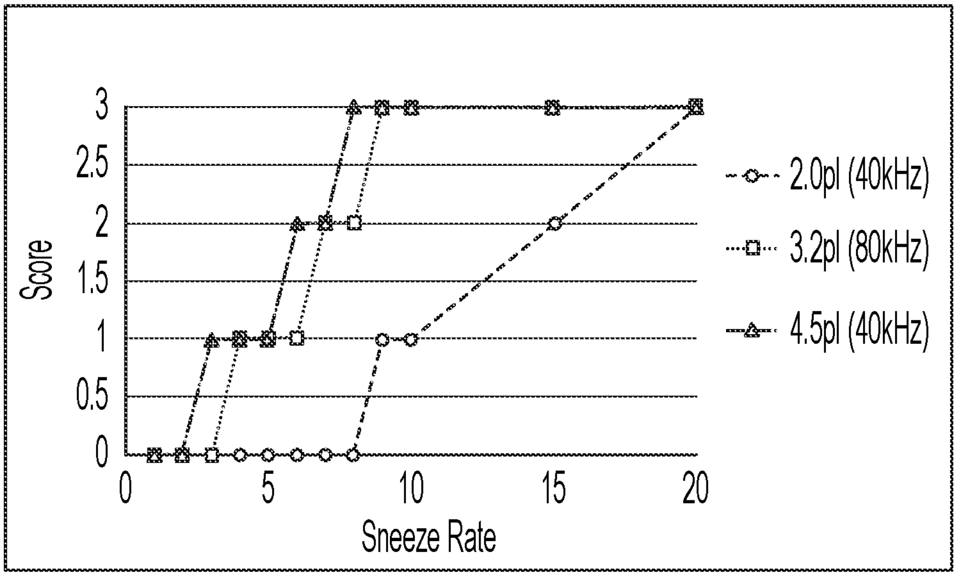
FIG. 4 is a graph of the visibility of sneeze patterns formed with drops of different volumes.
Figure 5:
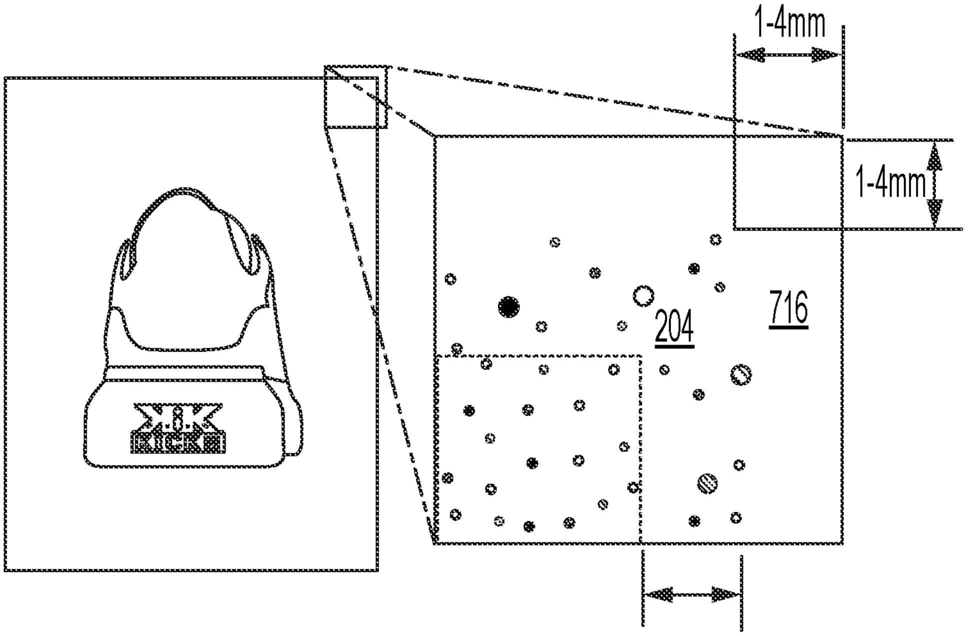
FIG. 5 depicts a distribution of ink drops having different volumes in a sneeze pattern formed by the inkjet printer of FIG. 1 that has an increasing density away from the edges of the media sheet.

Another way to maintain inkjet reliability is to eject larger drops because the higher peak-to-peak voltage in the firing signal for a larger drop helps to clear the inkjet; however, larger drops are more visible. The graph of FIG. 4 demonstrates the effect of drop size on the visibility of the uniform sneeze pattern. The largest drop size of 4.5 pl produced a noticeable uniform sneeze pattern at a sneeze rate of about 6, while a drop size of 3.2 pl produced a noticeable uniform sneeze pattern at a sneeze rate of about 8, and a drop size of 2.0 pl produced a noticeable uniform sneeze pattern at a sneeze rate of about 16. Thus, smaller sized ink drops are used for the pixels in the uniform sneeze pattern, while some larger drops can be used in the tapered area of the sneeze pattern where fewer pixels are located. As already noted, these larger drops are more effective for maintaining inkjet operational status at the lower sneeze rate achieved in the tapered area. Still, not all of the ink drops in the tapered area of the sneeze pattern can be large drops so some small drops are also ejected into the tapered area as shown in FIG. 5. The inclusion of the larger drops in the tapered area can be intermittent or steady-state.

In one embodiment, the pixel volumes are selected by using a second random number generator with a threshold that is a function of the threshold for the gating function. For example, a square root function can be used on the threshold for the gating function. In this example, if the threshold for the gating function is 0.5, then the threshold for identifying a pixel in the tapered area as a small pixel is about 0.70, which is roughly the sqrt (0.5). Since the threshold for the gating function in the tapered area is 1.0 at the interior boundary of the tapered area and is 0.0 at the exterior boundary, roughly fifty percent of the pixels that can be generated for the tapered area are generated. For these pixels to be generated, about 70% of them are identified as small volume drops using the 0.7 threshold, while 30% of them are identified as large volume drops. Consequently, about 35% of the pixels that could generated for the tapered area are identified as small volume drops (0.5×0.7), while 15% of the remaining pixels that could be generated for the tapered area are identified as large volume drops (0.5×0.3). The remaining 50% of pixels that could be generated for the tapered area are not generated.

Figure 7A:
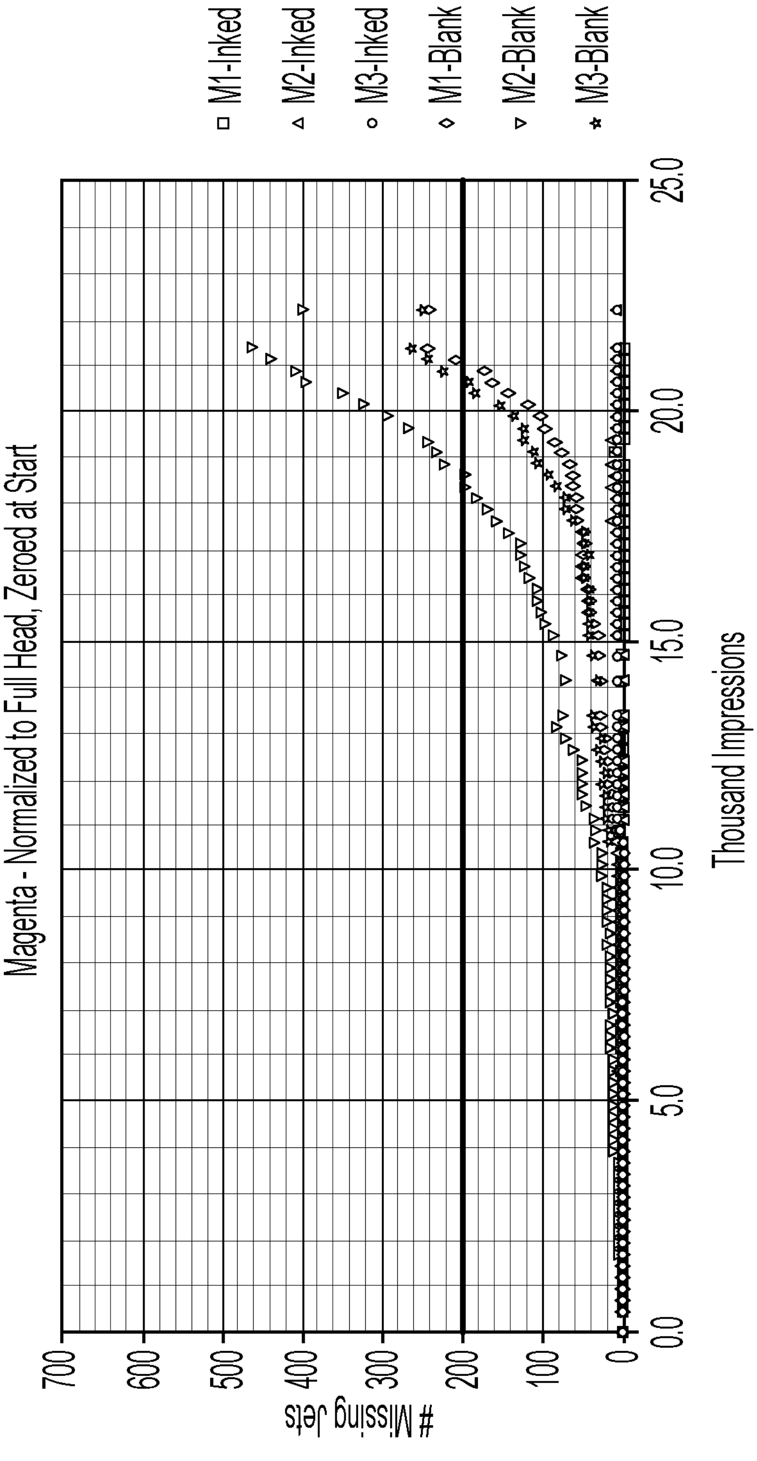
FIG. 7A is a graph showing the inoperative inkjet rate as a function of inkjet firing frequency and a nominal peak voltage used to operate the inkjets.
Figure 7B:
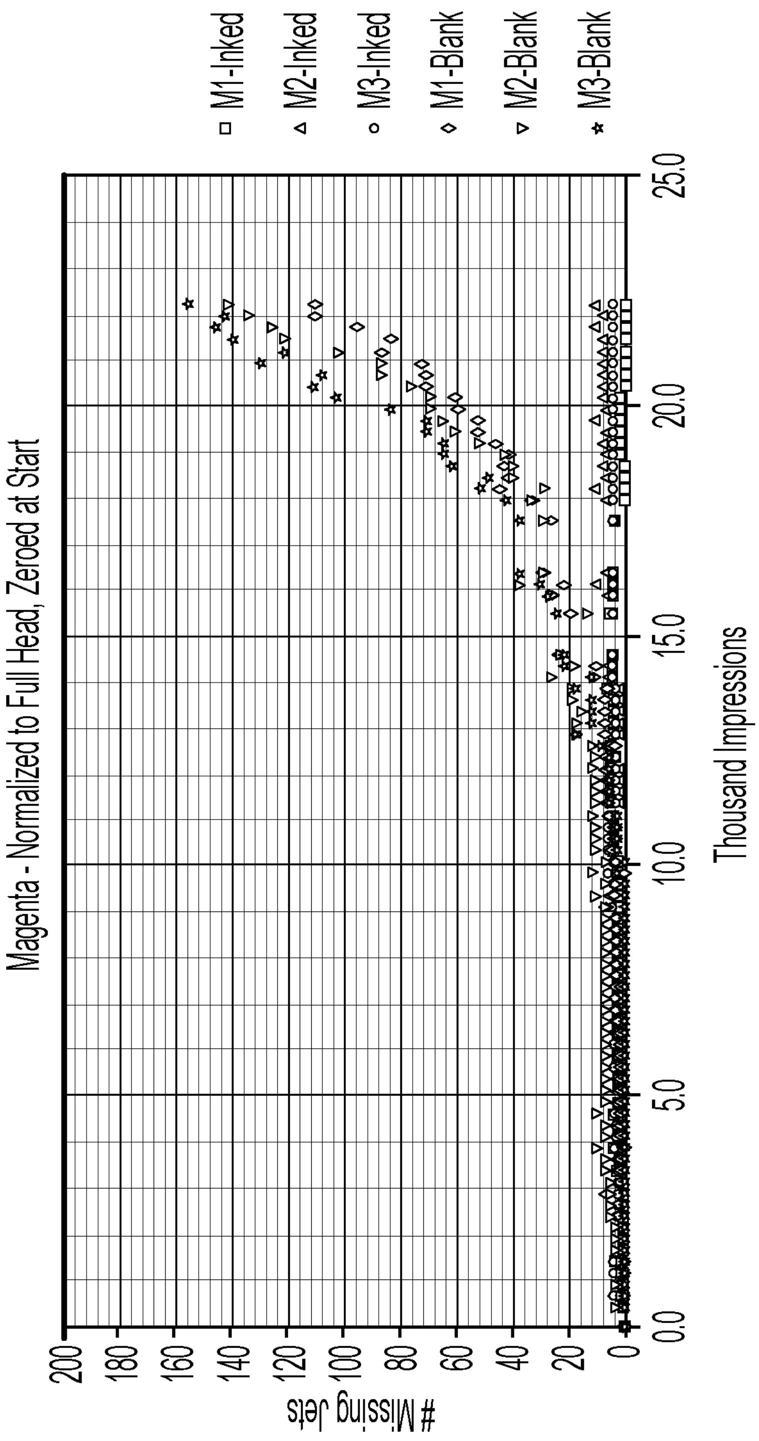
FIG. 7B is a graph showing the inoperative inkjet rate as a function of inkjet firing frequency and a higher peak voltage used to operate the inkjets.

The effect of peak voltage and the corresponding change in ejected ink drop volume on the reliability of inkjets is shown in a comparison of the graph of FIG. 7A with the graph of FIG. 7B. In the graph of FIG. 7A, the legend on the right side of the graph indicates that three magenta printheads are being operated with inkjets in the middle of each printhead not being fired at a rate that keeps the inkjets operative (M1 Blank, M2 Blank, and M3 Blank) and the inkjets on both sides of these inkjets (M1 Inked, M2 Inked, and M3 Inked) are fired at a rate capable of keeping the inkjets operational. All of the inkjets are fired with a peak voltage that produces ink drops having a volume of 4.5 pl. The horizontal axis shows the number of prints produced by the printheads in thousands, while the vertical axis shows the number of inoperative inkjets occurring over a run of 20,000 prints. The number of inoperative inkjets in the M1 Inked, M2 Inked, and M3 Inked printheads remains less than 200 inoperative inkjets over the 20,000 prints, while the number of inoperative inkjets in the M1 Blank, M2 Blank, and M3 Blank printheads is about 220 inoperative inkjets to about 480 inkjets over the run of 20,000 prints. In the graph of FIG. 7B, the same inkjets are operated in the same manner but the peak voltage is increased to a level that produces ink drops having a volume of 4.75 pl. The number of inoperative inkjets for those inkjets being operated at the operative inkjet rate drops below 20 inoperative inkjets, while the number of inoperative inkjets for the inkjets not operated at the operative inkjet rate drops to about 110 inoperative inkjets to about 160 inkjets. Thus, increasing the peak voltage used to operate the inkjets lowers the number of inoperative inkjets accumulated over a long print run. Consequently, using a higher peak voltage for the inkjets producing the tapered sneeze pattern helps ensure that even though these inkjets operate less frequently than the other inkjets producing the uniform sneeze pattern, they are less likely to accumulate a number of inoperative inkjets that is unacceptable.

Another approach to ensure that the inkjets forming the tapered area of the sneeze pattern in the marginal image area are more likely to remain reliable is to operate these inkjets a number of times sufficient to maintain the reliability of these inkjets. The drawback to this approach is that the inkjets forming the uniform sneeze pattern eject more sneeze drops than required for maintaining the reliability of the inkjets.

The dynamic threshold used by the phase gate is modified in the following manner. In the image area that is not part of the tapered area of the sneeze pattern, the threshold is set to a value of 1 or greater so all of the pixels generated for the uniform sneeze pattern are printed. Thus, the uniform sneeze pattern in the central area of the media sheet is unaltered. For the pixels of the sneeze pattern in the tapered area, the threshold value smoothly transitions to zero at the boundary where the tapered area borders the non-printed perimeter. This transition is a function of the distance between a sneeze pattern pixel and the edge of the image area of the media. In one embodiment, the threshold function is defined as: threshold=distance_to_image_area_edge (in mm)/6. This function enables all of the uniform sneeze pattern pixels 6 mm and further from the closest edge of the image area of the media sheet to remain in the pattern while pixels less than 6 mm from the closest image area edge of the media sheet are increasingly removed from the pattern as that distance decreases. For example, approximately 50% of the pixels about 3 mm from the edge of the image area are removed from the pattern. If the threshold function were selected to be a step function with a value of 1.0 within the uniform sneeze pattern and a value of 0.0 at the edge of the image area to the edge of the media sheet, then the uniform sneeze pattern would correspond to the current state where all of the sneeze pixels in the uniform sneeze pattern are included except in the non-printed perimeter. Other more complicated threshold functions can be used, such as a distance curve, for example, a raised cosine for a desired transitional attenuation range and sharpness of the sneeze pattern dissipation.

Figure 6:
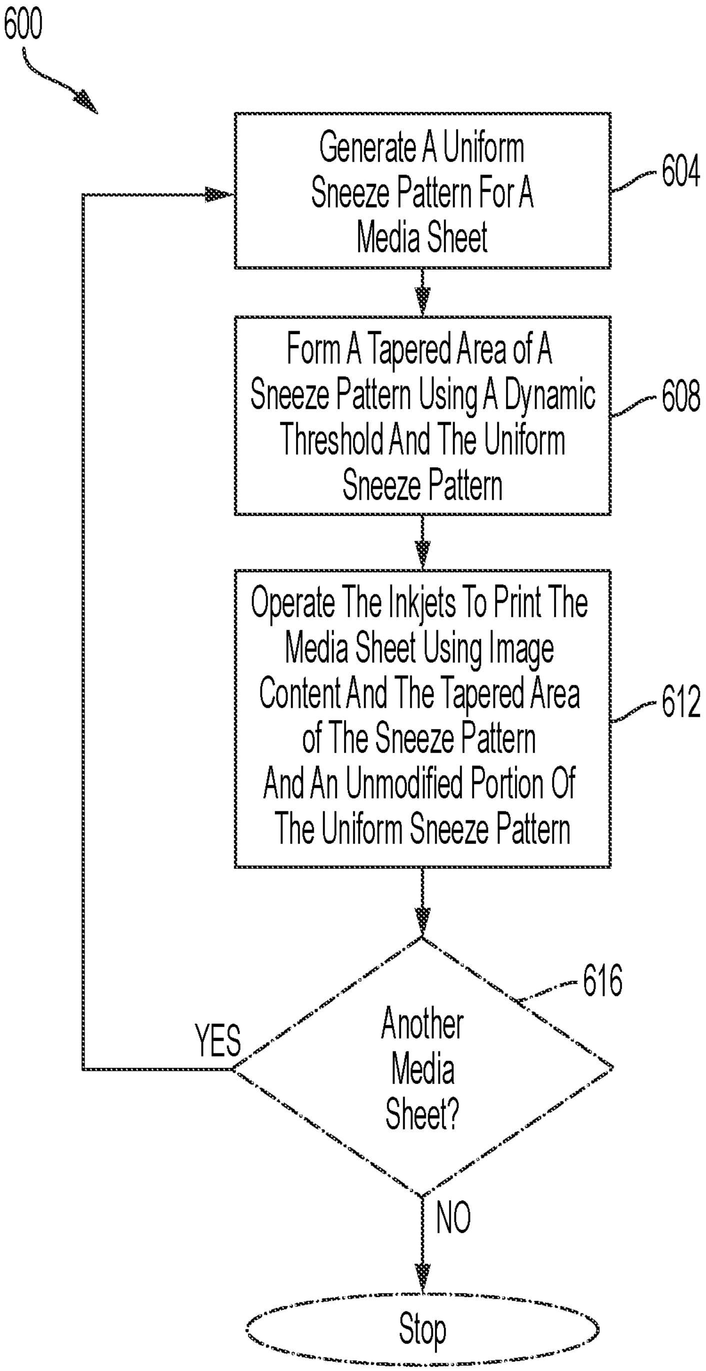
FIG. 6 is a flow diagram of a process used by the controller of the inkjet printer of FIG. 1 to maximize the number of ink drops in a sneeze pattern while minimizing the visibility of the pattern on the print.

A process 600 for generating a tapered area of a sneeze pattern used to maintain the operational status of inkjets in a printer is shown in FIG. 6. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

The process 600 begins with the generation of a uniform sneeze pattern for a media sheet (block 604). The uniform sneeze pattern can be generated by one of the methods in the application expressly incorporated in this application by reference above or another known method. This uniform sneeze pattern is modified to form a tapered area of the sneeze pattern using the dynamic threshold as discussed previously (block 608). The tapered area of the sneeze pattern and the image content for a media sheet are used to operate the inkjets to form an ink image and the sneeze pattern on the media sheet (block 612). The process determines if another media sheet is to be printed (block 616) and, if there is another media sheet, the process continues (blocks 604 to 616) until no other media sheets are to be printed.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. A method of operating inkjets to eject sneeze drops comprising:

generating a uniform sneeze pattern;

applying a first threshold to pixels in a portion of the uniform sneeze pattern to modify the portion of the uniform sneeze pattern and form a tapered area within the uniform sneeze pattern by:

generating a first random number for each pixel in the portion of the uniform sneeze pattern used to form the tapered area;

comparing the generated first random number for each pixel to the first threshold;

removing each pixel from the portion of the uniform sneeze pattern used to form the tapered area in response to the generated first random number of the pixel being greater than the first threshold; and operating inkjets using the uniform sneeze pattern and the tapered area within the uniform sneeze to print a sneeze pattern within an image area of a media sheet.

2. The method of claim 1 further comprising:

changing the threshold as the threshold is applied to the portion of the uniform sneeze pattern.

3. The method of claim 2, the changing of the threshold further comprising:

changing the threshold when a distance between one of the pixels in the portion of the uniform sneeze pattern used to form the tapered area and a closest edge of the image area of the media sheet on which the tapered area of the sneeze pattern is to be printed changes.

4. The method of claim 3 wherein the image area has an outside edge that is defined by a perimeter having a distance of 6 mm from the closest edge of the media sheet.

5. The method of claim 4 further comprising:

changing a volume of at least one pixel in the tapered area within the uniform sneeze pattern.

6. The method of claim 5 wherein the change of the volume is an increase in the volume.

7. The method of claim 6 further comprising:

generating a second random number for each pixel in the portion of the uniform sneeze pattern used to form the tapered area;

comparing the generated second random number for each pixel to a second threshold; and identifying each pixel from the portion of the uniform sneeze pattern used to form the tapered area as a small volume pixel in response to the generated second random number being less than the second threshold.

8. The method of claim 7 further comprising:

generating the second threshold using the first threshold.

9. An inkjet printer comprising:

a media transport configured to carry media sheets through the inkjet printer;

at least one printhead configured to eject ink drops onto the media sheets as the media sheets pass the at least one printhead;

a controller operatively connected to the at least one printhead, the controller being configured to:

generate a uniform sneeze pattern;

apply a first threshold to pixels in modify a portion of the generated uniform sneeze pattern to generate a tapered area within the uniform sneeze pattern by:

generating a random number for each pixel in the portion of the uniform sneeze pattern used to form the tapered area;

comparing the generated random number for each pixel to the first threshold;

removing each pixel from the portion of the uniform sneeze pattern used to form the tapered area in response to the generated random number of the pixel being greater than the first threshold; and operate inkjets in the at least one printhead using the uniform sneeze pattern and the tapered area within the uniform sneeze pattern to print a sneeze pattern within an image area of a media sheet as the media sheet passes the at least one printhead.

10. The inkjet printer of claim 9, the controller being further configured to:

change the first threshold as the first threshold is applied to the portion of the uniform sneeze pattern.

11. The inkjet printer of claim 10, the controller being further configured to:

change the first threshold when a distance between one of the pixels in the portion of the uniform sneeze pattern used to form the tapered area and a closest edge of the image area of the media sheet changes.

12. The inkjet printer of claim 11 wherein the image area has a perimeter that is defined by a distance of 6 mm from the closest edge of the media sheet.

13. The inkjet printer of claim 12, the controller being further configured to:

change a volume of at least one pixel in the tapered area within the uniform sneeze pattern.

14. The inkjet printer of claim 13, the controller being further configured to:

change the volume of the at least pixel by increasing the volume of the at least one pixel.

15. The inkjet printer of claim 13, the controller being further configured to:

generate a second random number for each pixel in the portion of the uniform sneeze pattern used to form the tapered area;

compare the generated second random number for each pixel to a second threshold; and identify each pixel from the portion of the uniform sneeze pattern used to form the tapered area as a small volume pixel in response to the generated second random number being less than the second threshold.

16. The inkjet printer of claim 15, the controller being further configured to:

generate the second threshold using the first threshold.

* * * * *